United States Patent [19]
Sekimura

[11] Patent Number: 5,186,054
[45] Date of Patent: Feb. 16, 1993

[54] CAPACITIVE PRESSURE SENSOR

[75] Inventor: Masayuki Sekimura, Tokyo, Japan

[73] Assignee: Kabushiki Kaisha Toshiba, Kawasaki, Japan

[21] Appl. No.: 619,946

[22] Filed: Nov. 29, 1990

[30] Foreign Application Priority Data

Nov. 29, 1989 [JP] Japan .................. 1-312113

[51] Int. Cl.$^5$ ............................ G01L 7/08; G01L 9/12
[52] U.S. Cl. ....................................... 73/724; 73/718; 361/283
[58] Field of Search .................. 73/718, 724; 361/283

[56] References Cited

U.S. PATENT DOCUMENTS

| | | | |
|---|---|---|---|
| 3,993,939 | 11/1976 | Slavin et al. | 361/283 |
| 4,092,696 | 5/1978 | Boesen et al. | 361/283 |
| 4,823,230 | 4/1989 | Tiemann | 361/283 |
| 4,831,492 | 5/1989 | Kuisma | 73/724 |

FOREIGN PATENT DOCUMENTS

0245032A2 11/1987 European Pat. Off. .
2198611A 6/1988 United Kingdom .

Primary Examiner—Donald O. Woodiel
Attorney, Agent, or Firm—Banner, Birch, McKie & Beckett

[57] ABSTRACT

A capacitive pressure sensor includes a set of facing electrodes arranged with a cavity disposed therebetween and having insulation layers respectively formed on the surfaces thereof. The contact area between the facing electrodes varies directly with the applied pressure, and variation in the contact area causes variation in the capacitance which is detected as a pressure measurement. Since the capacitance variation is proportional to the applied pressure, a pressure signal which is substantially linear can be obtained. Therefore, the capacitive pressure sensor of this invention can measure pressure with high precision.

8 Claims, 6 Drawing Sheets

CAPACITIVE PRESSURE SENSOR

FIELD OF THE INVENTION

This invention relates to a capacitive pressure sensor for measuring fluid pressure as a variation in the capacitance of an electric element.

DESCRIPTION OF THE RELATED ART

A prior art capacitance-type semiconductor pressure sensor for measuring absolute pressure of device 6 is shown in the cross sectional view of FIG. 1. This pressure sensor includes a main body portion having a vacuum chamber (cavity) 3 formed between a flexible Si diaphragm base 1 and an oppositely positioned plate 2. Electrode plates 4 and 5 are respectively disposed on the inner wall surfaces of Si diaphragm base 1 and plate 2. The sensor is positioned in fluid communication with housing 6 via pressure inlet port 6a. In particular, the sensor is fixedly and integrally formed on the Si diaphragm base 1 of the main body portion. In accordance with the construction, the sensor of FIG. 1 measures the absolute pressure according to variations in the capacitance C between electrodes 4 and 5. These variations are caused by the deflection of diaphragm 1 in accordance with the application of pressure P via inlet port 6a.

Pressure measurement is effected by detecting the variations in capacitance represented by a pressure signal. In this case, the capacitance C can be expressed as follows:

$$C = E_O * E_S S/d \qquad (1)$$

where $E_O$ is the dielectric constant of the vacuum, $E_S$ is the relative dielectric constant, S is the area of the electrode plate, and d is the distance between the electrode plates 4 and 5. Distance d varies linearly with pressure P as shown in FIG. 2(a) and, accordingly, the capacitance varies inversely with the distance between the electrodes, as shown in FIG. 2(b). As a result, it is very difficult to obtain precision measurements since the output capacitance does not vary substantially linearly with pressure. This is a defect inherent in capacitive pressure sensors having the above construction and operational design. Therefore, it is desirable to provide a capacitive pressure sensor capable of supplying an output capacitance which varies substantially linearly with pressure in order to enhance the simplicity and accuracy of measurements.

As shown in FIG. 2(c), the relationship between the variation in capacitance and pressure is nonlinear. Given a particular change in capacitance (WCapacitance) along the vertical axis, the corresponding change in pressure (WPressure) is found along the horizontal axis. In order to accurately convert the sensed output capacitance variation into a signal representing pressure complex digital circuitry is necessary, such as a microcomputer. This adds further complexity and cost to the capacitance sensing apparatus. It is therefore preferable to use analog circuitry to reduce cost and complexity while maintaining precision. However, analog circuitry cannot readily be adapted to such nonlinear conversion operation due, in part, to the manufacturing tolerance of components. Consequently, an object of the present invention is to design a pressure sensor having substantially linear characteristics which provides an output that can be readily and simply converted to a pressure signal by using, for example, analog circuitry.

With the conventional capacitance-type semiconductor pressure sensor, if the diaphragm is made thinner, the sensitivity to changes in pressure, and thus the precision, will be enhanced. This occurs because the thin diaphragm will undergo a greater deflection in response to a change in pressure than a corresponding thick diaphragm. Referring again to FIG. 1, at some point in its deflection the electrode 4 of diaphragm 1 will come into contact with the opposing electrode 5, which will effectively short circuit the sensor, thereby rendering it inoperative. In order for it to work properly, the diaphragm must be thick enough so as to prevent the facing electrodes from contacting each other.

Therefore, a trade-off exists in the prior art between the ability to measure a large range of pressures and the ability to maintain high precision. For example, if the diaphragm is made thinner to increase precision, higher pressures (e.g. approximately 1 Kg/cm$^2$) will not be able to be measured because the facing electrodes will come into contact. On the other hand, if the diaphragm is made thicker to measure higher pressures, the precision of the pressure measurements will decrease. Thus, it is desired to provide a capacitive pressure sensor capable of measuring both lower pressures and higher pressures with a high degree of precision.

SUMMARY OF THE INVENTION

The present invention overcomes the problems of the prior art by providing a capacitive pressure sensor capable of easily supplying a stable capacitance which varies in a substantially linear manner with the applied pressure.

A capacitive pressure sensor according to the present invention comprises a set of facing electrodes which are arranged with a cavity disposed therebetween, insulation layers respectively provided on the facing electrodes, and moving means for moving the facing electrodes to vary the contact area between the facing electrodes in proportion to the fluid pressure. The facing electrodes are set into contact with each other when a reference pressure is applied to the diaphragm. When a relative pressure is additionally applied to the diaphragm, the contact area between the electrodes is increased so as to vary the capacitance relative to the applied pressure. Since the capacitance varies directly with the applied pressure, a substantially linear capacitance is obtained for precision measurement using simple circuitry. In addition, because the facing electrodes are set into contact with one another, a thinner diaphragm may be utilized in order to increase precision because the corresponding rupture resistance is increased.

DETAILED DESCRIPTION

Figure 1:
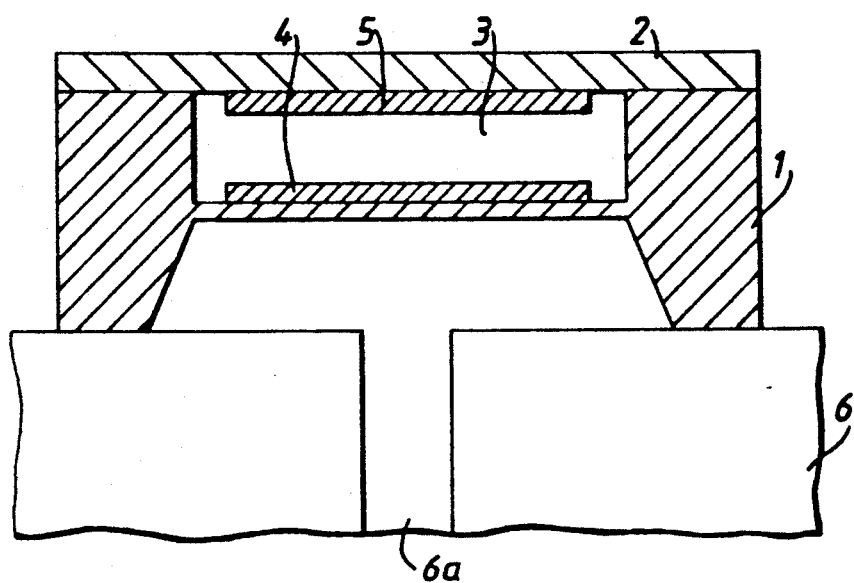
FIG. 1 is a cross sectional view showing the main portion of a conventional capacitance-type semiconductor pressure sensor.
Figure 2A:
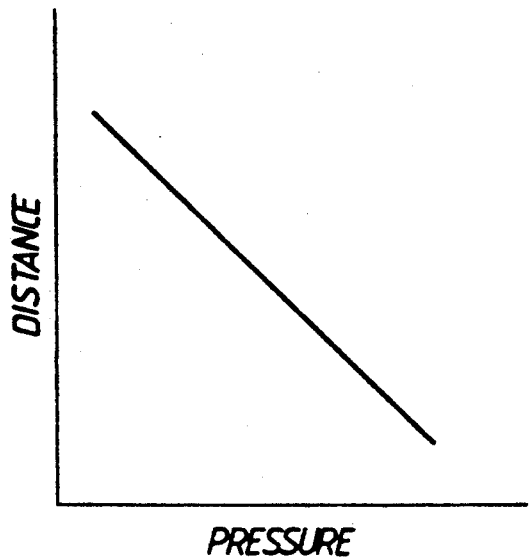
FIG. 2(a) is a graph representing the pressure applied to the pressure sensor of FIG. 1 versus the resulting distance between the two electrodes.
Figure 2B:
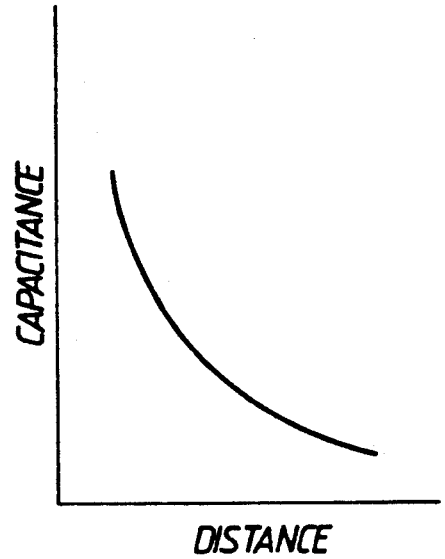
FIG. 2(b) is a graph representing the distance between the two electrodes in the pressure sensor of FIG. 1 versus the resulting electrical capacitance.
Figure 2C:
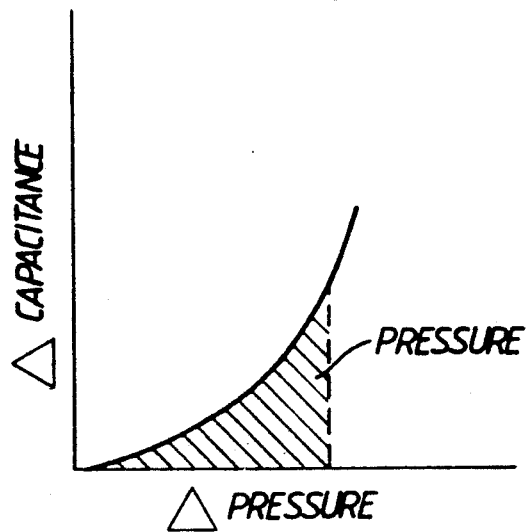
FIG. 2(c) is a graph representing the change in electrical capacitance of the pressure sensor of FIG. 1 versus the corresponding change in pressure.
Figure 3:
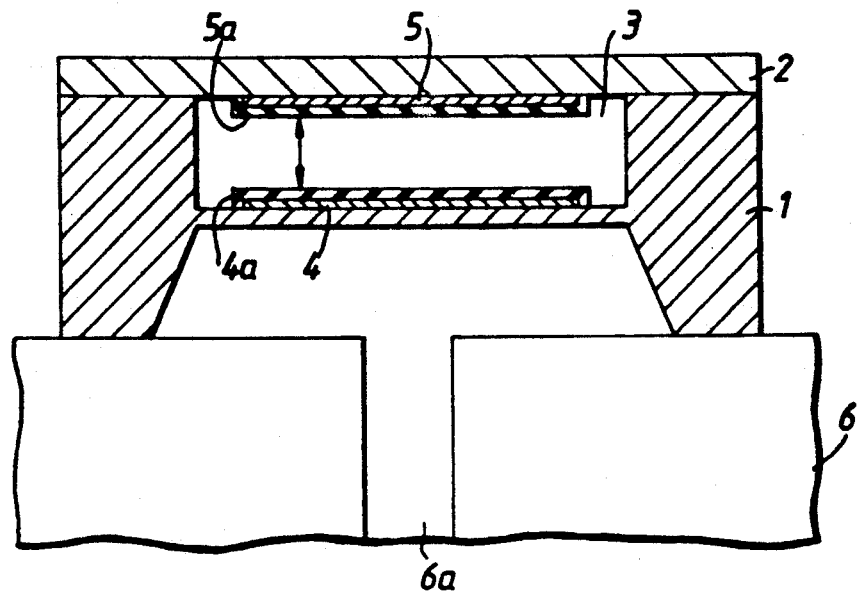
FIG. 3 is a cross sectional view of a capacitance-type semiconductor pressure sensor according to one embodiment of the present invention.

There will now be described an embodiment of the invention with reference to FIGS. 3 through 5. FIG. 3 is a cross sectional view showing the main portion of a capacitance-type semiconductor pressure sensor according to one embodiment of this invention. Shown in FIG. 3 is the main portion of the sensor comprising: Si diaphragm base 1, plate 2, vacuum chamber (cavity 3) formed between the Si diaphragm 1 and plate 2, and a pair of facing electrode plates 4 and 5 disposed on the facing inner wall surfaces of the cavity. The construction of diaphragm 1 is not limited to a silicon semiconductor, but can be formed of other metallic materials.

Each electrode includes a respective insulation layer 4a and 5a. The insulation layers are formed respectively on the exposed surfaces of the electrode plates for preventing the electrical connection of the plates. The pressure from device 6 is sensed via pressure inlet port 6a. The sensor's diaphragm base 1 is fixedly and integrally formed onto device 6. In the pressure sensor of FIG. 4, the diaphragm is formed in a deflected configuration. In this embodiment, base 1, electrode 4, and insulation layer 4a are deflected toward plate 2 and electrode 4 has a portion of its insulating layer 4a contacting a portion of insulating layer 5a of opposing electrode 5 of plate 2.

Figure 4:
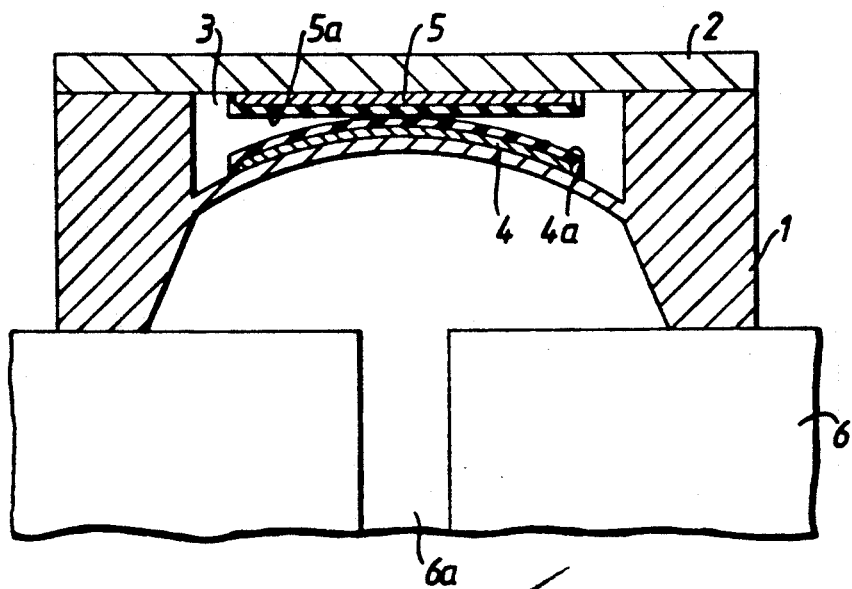
FIG. 4 is a cross-sectional view of a capacitance-type semiconductor pressure sensor according to another embodiment of the present invention.

The operating principle of the capacitance-type semiconductor pressure sensor of FIG. 4 is now explained. The capacitance C between the two electrodes is obtained as the sum of the capacitance $C_c$ between the contacting portions of the facing electrodes and the capacitance $C_n$ between the non-contacting portions (i.e., $C=C_c+C_n$). When pressure P is applied via pressure inlet 6a, the Si diaphragm 1 is further deflected and the contacting area between diaphragm 1 and plate 2 increases, thus increasing the capacitance $C_c$ between the contacting portions. In contrast, the capacitance $C_n$ between the non-contacting portions decreases due to the decrease in the area between the non-contacting portions. However, since the decrease in capacitance $C_n$ is extremely small in comparison with the increase in capacitance $C_c$, the effective amount of increase in capacitance is substantially equal to the variation in the capacitance $C_c$ between the contacting portions. Since the capacitance $C_c$ between the contacting portions varies linearly with the contacting area according to equation (1) above, the capacitance C can be considered as varying linearly with the amount of the contacting area.

With a conventional capacitance-type semiconductor pressure sensor, the capacitance varies in accordance with variations in the distance d between the electrodes caused by the applied pressure. However, the pressure sensor of the present invention has it s capacitance varied in accordance with the amount of the contacting area between the facing electrodes.

When a circular diaphragm is used, the deflection W(r) of diaphragm plate 1 can be expressed as follows:

$$W(r)=C*(R^2-r^2)^2*P \quad (2)$$

where C is a constant, R is the radius of the diaphragm, r is the distance from the center of the diaphragm, and P is the pressure.

Figure 5:
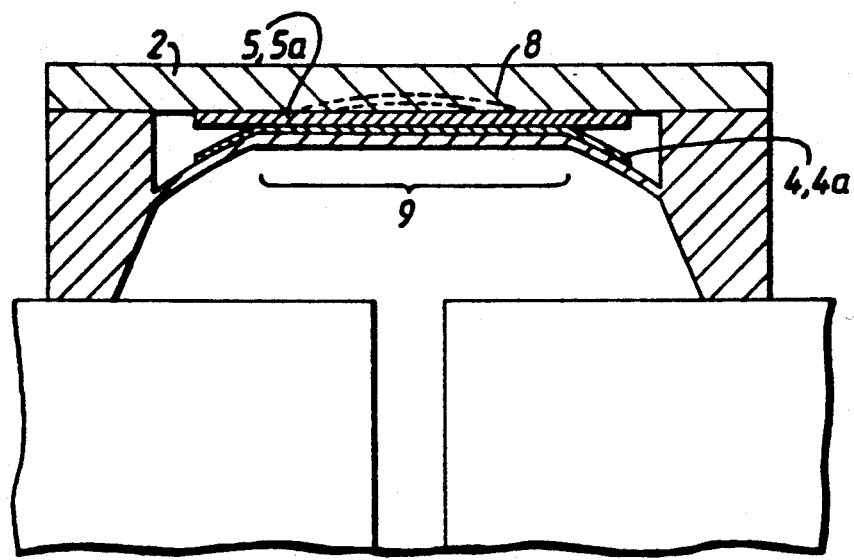
FIG. 5 is a cross-sectional view illustrating the operation of the capacitance-type semiconductor pressure sensor shown in FIG. 4.

Referring to FIG. 5, a cross-sectional view of an embodiment of the present invention is shown wherein the circular diaphragm has been deflected by the application of pressure so that an area of the diaphragm is in contact with the opposing surface. The broken lines 8 represent the extent of deflection of the diaphragm that would presumably take place in the absence of plate 2, electrode 5 and insulating layer 5a. Area 9 represents the area of the insulation 4a that is in contact with opposing insulation 5a. When the defection W(r) of the diaphragm becomes larger than the distance between the facing electrodes then the above relationship becomes W(r)=d, where d represents the distance between the undeflected electrodes. The equation for W(r)<d representing the non-contacting portion is the same as equation (2) above. Thus, the variation in contacting area with respect to variation WP in pressure after the facing electrodes are brought into contact with each other can be expressed as follows:

$$WS=\pi C_o WP \quad (3)$$

where WS is the variation in contacting area, R is the radius of the diaphragm, and $C_1$ and $C_2$ are constants. As can be seen from equation (3), the contacting area, and therefore the capacitance, varies in accordance with the pressure P.

Figure 6:
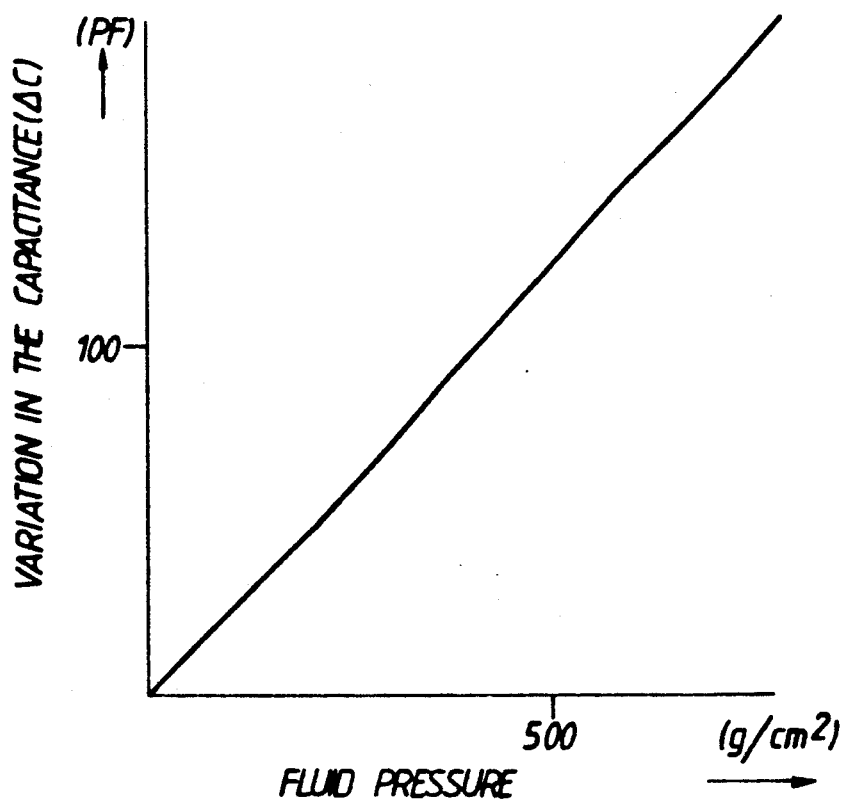
FIG. 6 is graph representing pressure versus capacitance of a capacitance-type semiconductor pressure sensor according to the present invention.

FIG. 6 is a graph representing the pressure-capacitance characteristics of a capacitance-type semiconductor pressure sensor according to the present invention. The vertical axis corresponds to the variation in capacitance, measured in picofarads, and the horizontal axis corresponds to the fluid pressure, measured in grams/cm$^2$. As seen from the figure, the capacitance varies directly with the applied pressure. The pressure sensor of this embodiment has a square diaphragm with an area of 6.5 mm×6.5 mm, and a thickness of 100 um formed by an Si anisotropic etching process. The area of the electrode plate is 5.0 mm×5.0 mm, and the distance between the electrode plates if 5 um.

In the pressure sensor of this invention, the diaphragm 1 is formed in a deflected or convex configuration whereby it partially contacts plate 2 when no pressure is applied. Alternatively, diaphragm 1 is formed whereby it is sufficiently deflected to contact plate 2 when a reference pressure is applied to the diaphragm during use. This deflected configuration is obtained by machining or by the following method. After the diaphragm is formed by an Si anisotropic etching process:

i) a silicon oxide film is formed by a CVD method on the diaphragms inner surface (i.e., the diaphragm's surface which faces the cavity) or ii) a silicon nitride film is formed on the outer surface of the diaphragm. During formation of the oxide film or nitride film the temperature is kept high, but afterwards, while the film is cooled to a normal temperature, the diaphragm deflects toward the cavity by the internal stress caused by differences between the coefficients of thermal expansion of the silicon film and the silicon oxide film (or silicon nitride film).

In the event a capacitive pressure sensor is desired for measuring absolute pressure of more than 0.5 kg/cm$^2$, the diaphragm 1 can be made initially in a flat configuration and designed to have such dimensions that it will be deflected and set into contact with the plate 2 by application of a pressure essentially equal to 0.5 kg/cm$^2$. In this configuration, the pressure needed to set diaphragm 1 into contact with plate 2 serves an offset relative to the additional pressure measured beyond 0.5 kg/cm$^2$. The diaphragm 1 can of course, also be designed to utilize any convenient offset pressure other than 0.5 kg/cm$^2$.

Referring again to the pressure sensor of FIG. 3, because the diaphragm 1 is designed to contact the opposite electrode in cavity 3, the rupture resistance of the diaphragm is accordingly enhanced. Therefore, the diaphragm may be made thinner while the pressure resistance level is maintained and the sensitivity is enhanced. With a conventional capacitance-type semiconductor pressure sensor, the sensitivity cannot be enhanced in this manner because the electrodes cannot come into contact with one another without rendering the sensor inoperable.

Figure 7A:
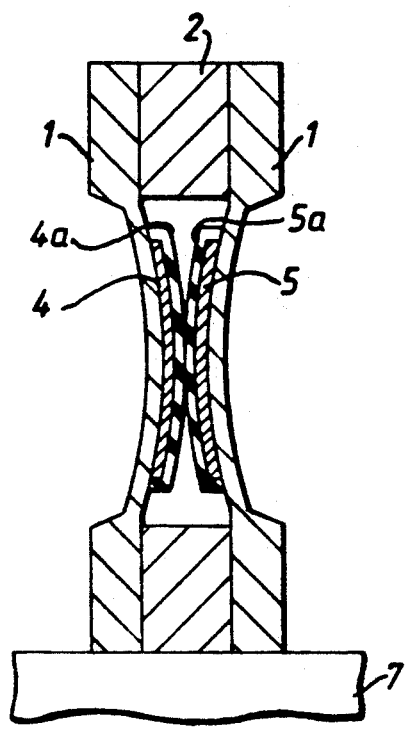
FIGS. 7A and 7B are a cross sectional views showing capacitance-type semiconductor pressure sensors according to other embodiments of this invention.

In FIG. 3, the diaphragm base 1 is integrally formed and fixed on device 6. In another embodiment of the present invention, as shown in FIG. 7a, the main body portion can comprise two movable diaphragm bases 1, wherein one end of the main body portion is mounted on a supporting member 7. In this embodiment, the sensor could be utilized to measure the absolute pressure surrounding the sensor.

Figure 7B:
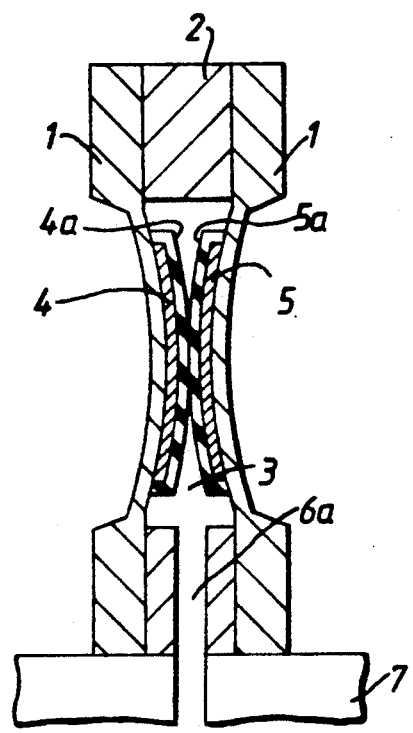

In still another embodiment, shown in FIG. 7b, the sensor can be utilized to measure differential pressure. In this embodiment, the inlet port 6a is formed into the cavity 3 through the supporting member 7. A first pressure is applied outside of the sensor, and a second pressure is applied into the cavity 3 through the pressure inlet port 6a. The resulting capacitance between electrodes 4 and 5 is determined based upon the difference between the first and second pressures.

Figure 8:
FIG. 8 is a cross-sectional view and block diagram of another embodiment of the capacitance-type semiconductor pressure sensor of the present invention comprising a deice for measuring barometric pressure.
Figure 9:
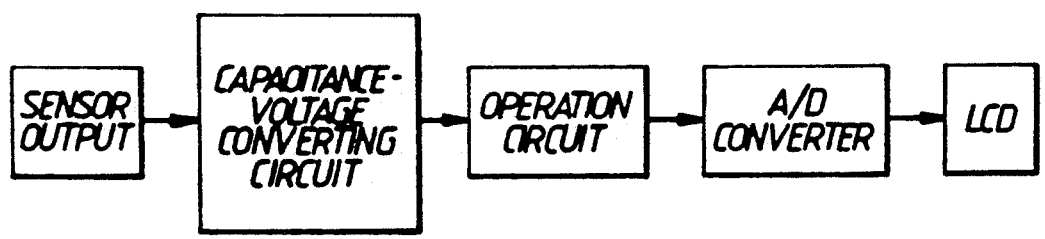
FIG. 9 is a block diagram showing an embodiment comprising components for converting the capacitance produced by the capacitance-type semiconductor pressure sensor of the present invention into a usable form.

Pressure sensors, according to the present invention, can be used in a variety of applications ranging from controlling and measuring intake pressure on automotive engines to pressure sensors for measuring blood pressure, for example, a barometer used for forecasting weather and the like is explained with reference to FIGS. 8 and 9. As shown in the FIG. 8, the capacitive pressure sensor is mounted on the base plate of a signal processing peripheral circuit. The package is formed with a pressure inlet port 10 which is disposed opposite to the diaphragm of the sensor. During barometer measurement, the inlet port is open to the atmosphere and atmospheric pressure is applied to the diaphragm. As shown in the block diagram of FIG. 9, a sensor output is converted into a voltage by an analog capacitance-voltage converting circuit and is then processed by an operational amplifier circuit to provide an appropriate voltage offset. The voltage offset is provided so that a zero pressure output signal is provided when no input is applied. The processed voltage is supplied to a display device, such a s a liquid crystal display (LCD), via an A/D converter and the atmospheric pressure is displayed.

I claim:

1. A capacitive pressure sensor for use in measuring the pressure of a fluid comprising:

a pair of acing electrodes having a cavity disposed therebetween wherein a portion of at least one of said electrodes is movable to a position contacting the other electrode, and wherein at least one of said facing electrodes includes an insulation layer on a portion of a surface facing the other electrode;

movable means for moving said at least one electrode for varying the contacting area between said facing electrodes in response to the pressure of the fluid, thereby varying the capacitance of said pair of facing electrodes in a linear manner with respect to said pressure.

2. A capacitive pressure sensor according to claim 1, wherein said movable means is a silicon diaphragm.

3. A capacitive pressure sensor according to claim 2, wherein said at least one electrode is disposed on said silicon diaphragm.

4. A capacitive pressure sensor according to claim 3, wherein said silicon diaphragm is formed in a deflected configuration.

5. A capacitive pressure sensor according to claim 3, wherein said silicon diaphragm is formed in a substantially flat configuration.

6. A capacitive pressure sensor according to claim 1, wherein said facing electrodes remain spaced from each other when no pressure is applied and partially contact each other when pressure is applied.

7. A capacitive pressure sensor according to claim 1, wherein said facing electrodes partially contact each other when no pressure is applied.

8. A capacitive pressure sensor according to claim 1 wherein said movable means includes two spaced silicon diaphragms and each of said facing electrodes is disposed on a respective one of said silicon diaphragms.

* * * * *